(No Model.)  5 Sheets—Sheet 1.
E. J. WESTON.
CABLE ROAD AND MACHINERY FOR OPERATING THE SAME.
No. 382,575. Patented May 8, 1888.
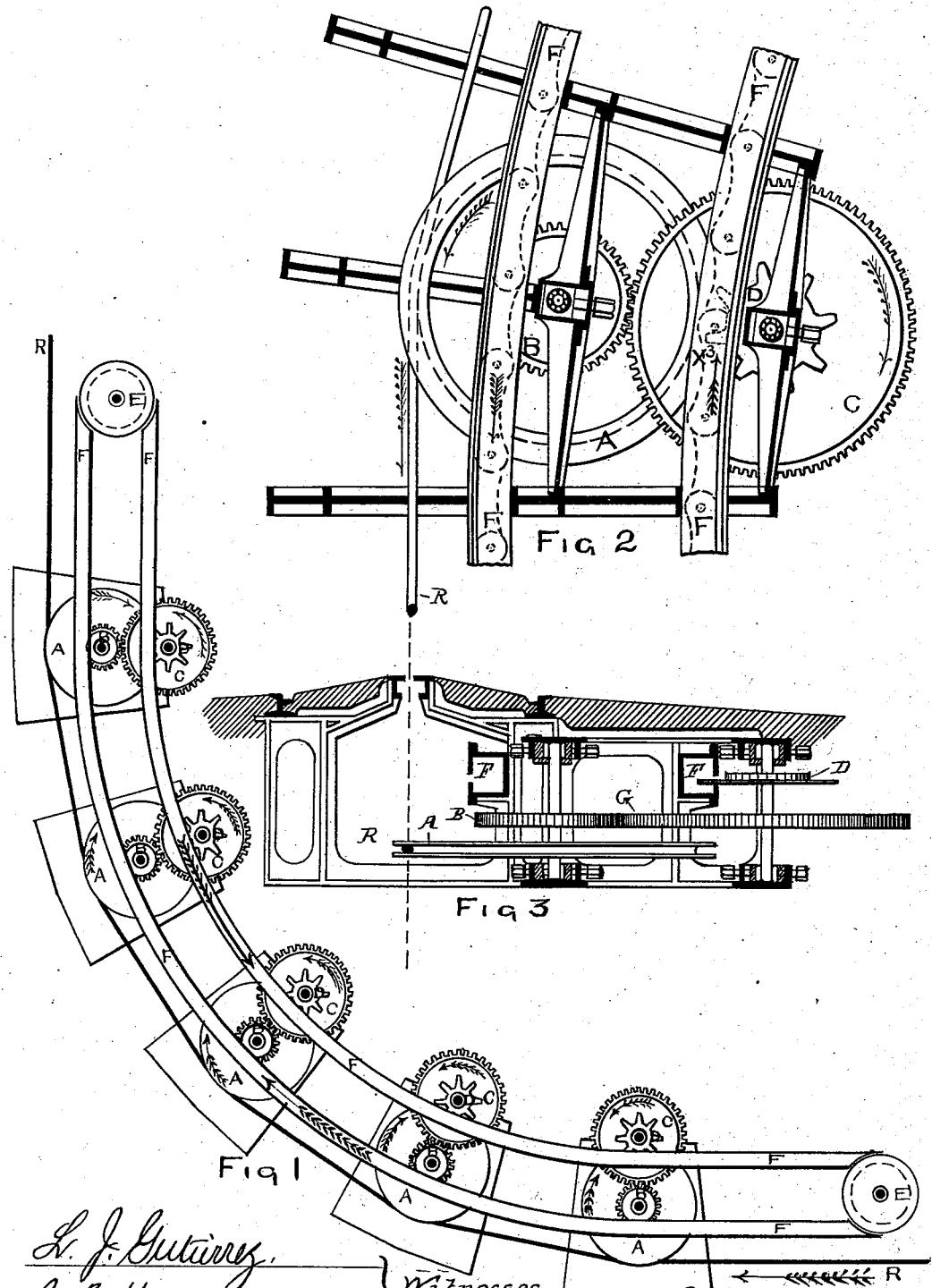

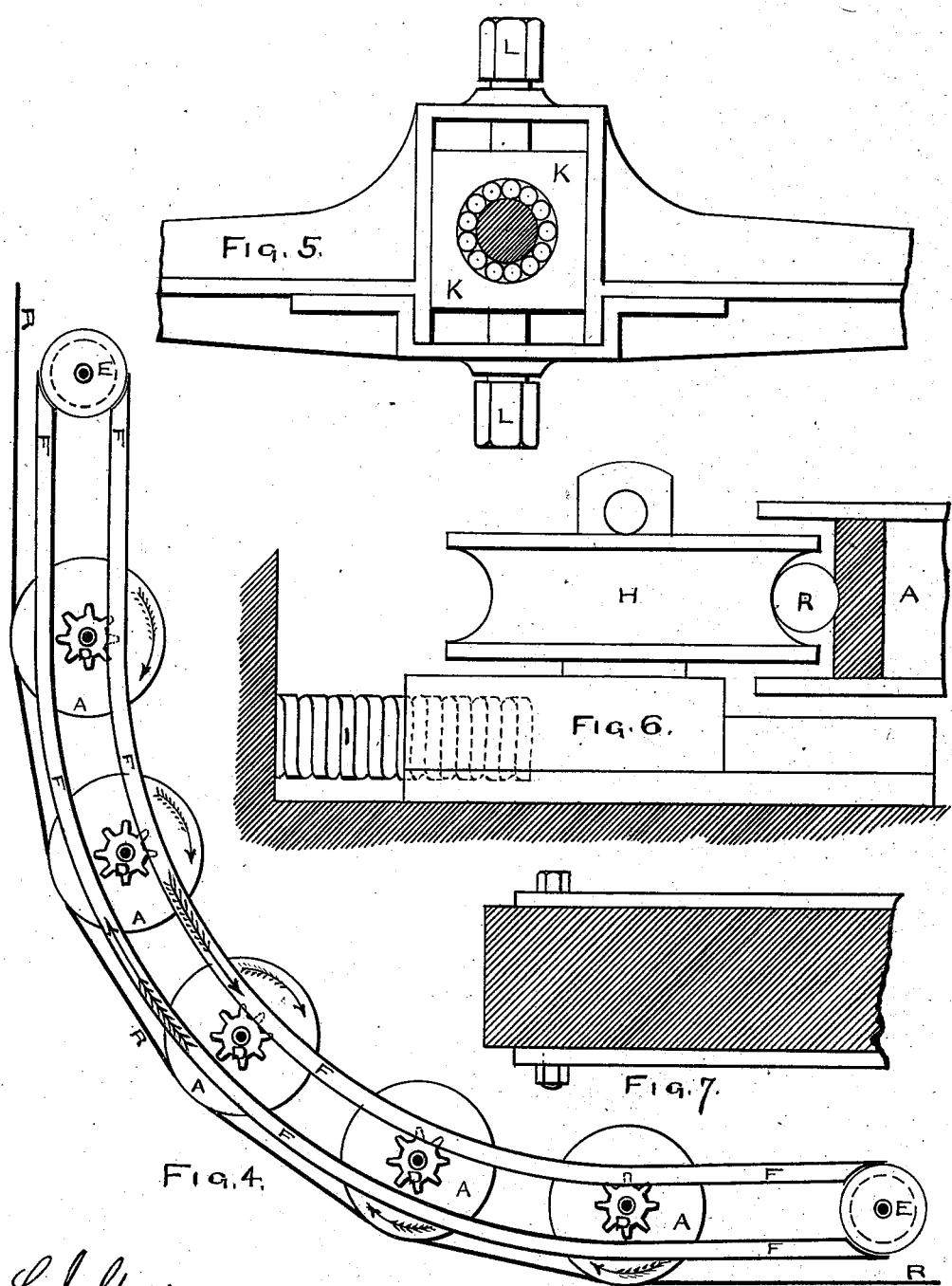

(No Model.) 5 Sheets—Sheet 3.
E. J. WESTON.
CABLE ROAD AND MACHINERY FOR OPERATING THE SAME.
No. 382,575. Patented May 8, 1888.
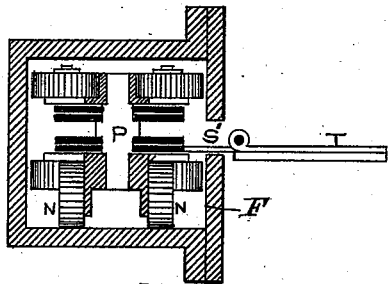
Fig. 13.
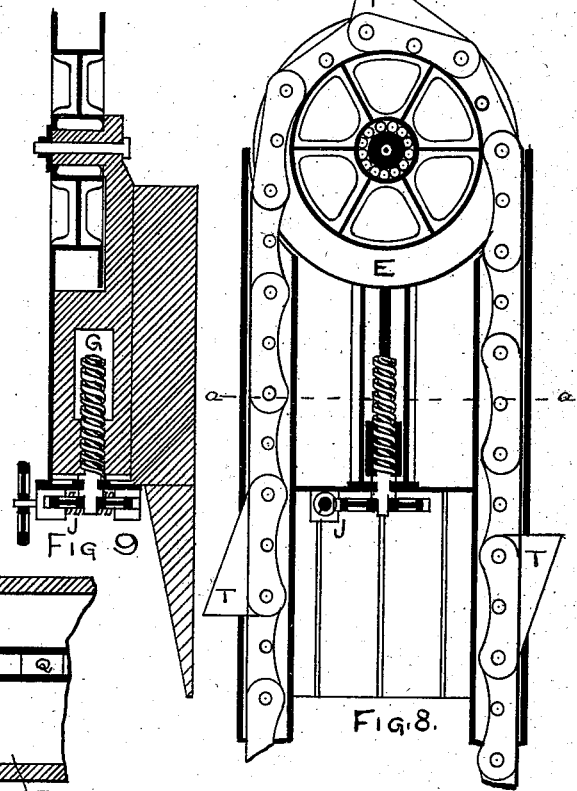
Fig. 9.
Fig. 8.
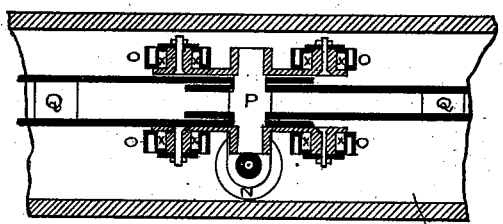
Fig. 12.
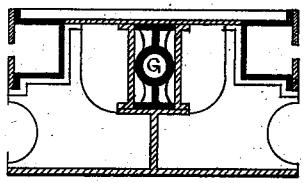
Fig. 10.
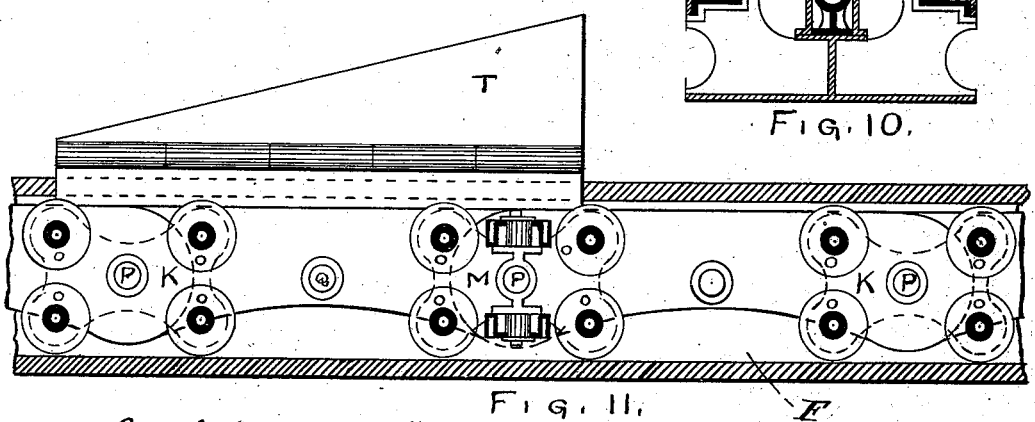
Fig. 11.
Witnesses:
L. J. Gutierrez.
J. E. Hamill.
Inventor:
Edwin John Weston.

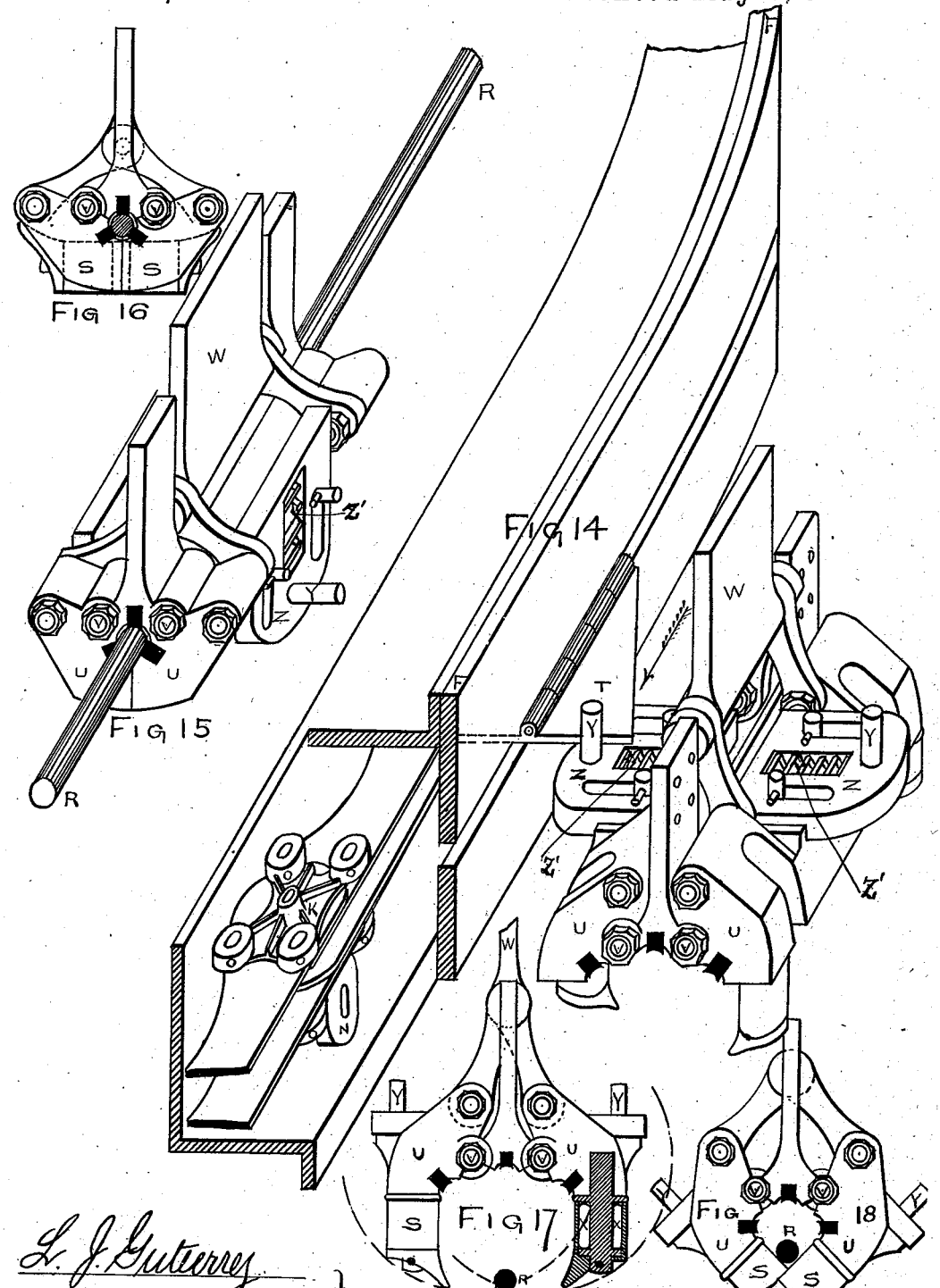

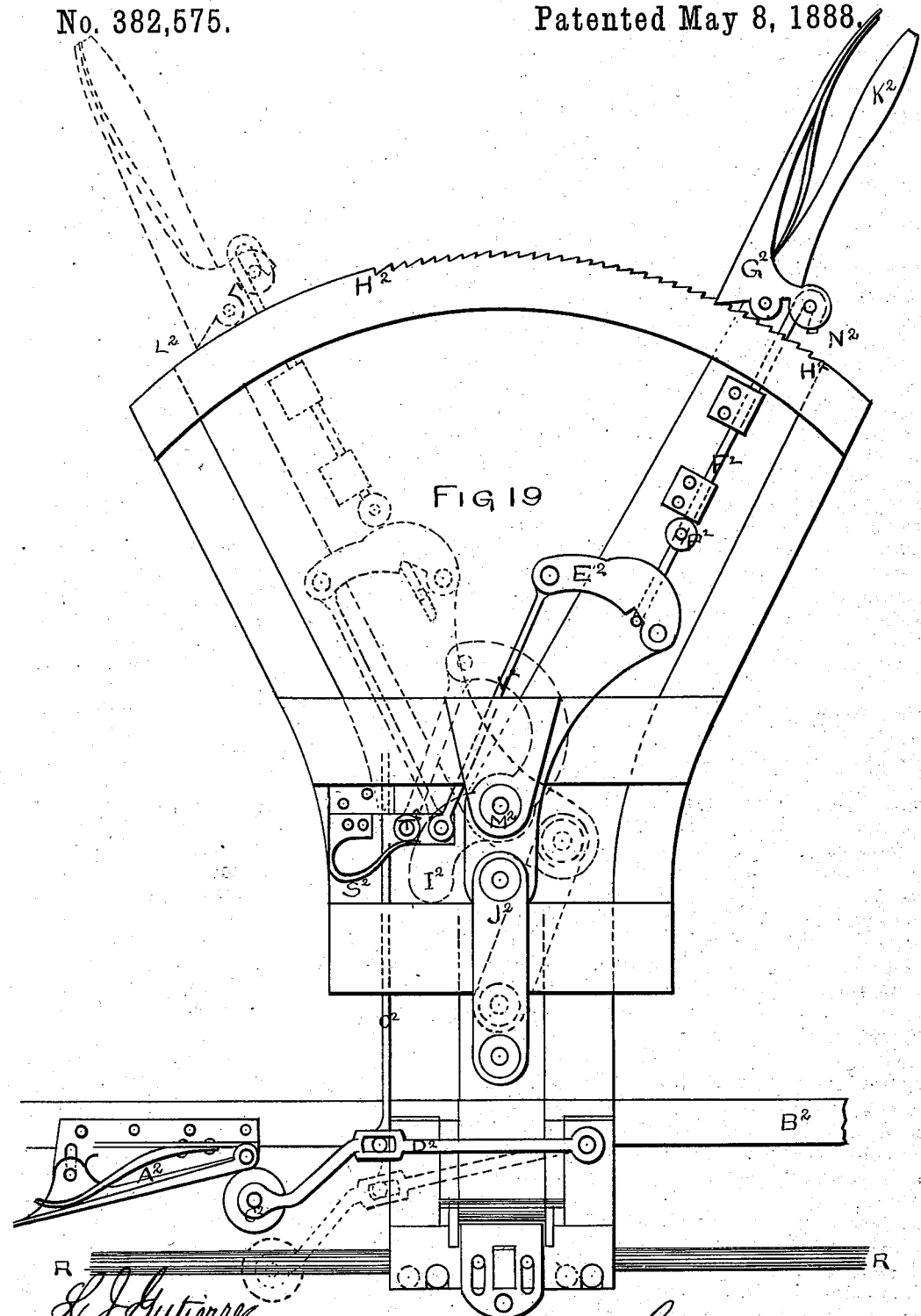

UNITED STATES PATENT OFFICE.

EDWIN JOHN WESTON, OF SAN FRANCISCO, CALIFORNIA.

CABLE ROAD AND MACHINERY FOR OPERATING THE SAME.

SPECIFICATION forming part of Letters Patent No. 382,575, dated May 8, 1888.

Application filed July 11, 1881. Serial No. 37,624. (No model.)

*To all whom it may concern:*

Be it known that I, EDWIN JOHN WESTON, of the city and county of San Francisco and State of California, have invented a new and useful improvement in cable roads and in the machinery used for operating said cable roads, by means of which street, freight, or passenger cars or dummies propelled or drawn by a wire or other cable are propelled or drawn round curves of any degree of curvature or of any radius, are enabled to cross other cables traveling on a course at any angle with its track, or to pass or switch off from one cable to another, either endwise or laterally, by transferring power from the cable to an endless chain traveling at a greater, a less, or a similar rate of speed as that of the cable from which its power is derived or by other motive power.

In the accompanying drawings, five (5) in number, in which similar letters of reference indicate like parts, Figure 1 is a plan of a curve. Fig. 2 is a plan of one of the sets of pulleys and gear-wheels shown at Fig. 1. Fig. 3 is a section of Fig. 2. Fig. 4 is a plan of a curve, showing a simpler system of gear-work for use on curves where there is less friction or resistance to the wheels of the cars or dummies, or where they are of a lighter description than those in use on Fig. 1. Fig. 5 shows anti-friction bearings in an adjustable block, K, for the shafts of the pulleys or gear-wheels to revolve in. Fig. 6 shows a method of increasing the friction of the rope or cable on the sheaves or pulleys A. Fig. 7 shows a method of friction-gearing in place of the gear-wheels B C, Fig. 1, for use in places where it may be necessary or desirable to use mechanism of a noiseless description. Fig. 8 is an enlarged horizontal section through the end of the chain-tube F F, Fig. 1. Fig. 9 is a longitudinal section through Fig. 8. Fig. 10 is a cross-section through Fig. 8 on line *a a*. Fig. 11 is an enlarged horizontal section through the chain-tube F F, Fig. 1, showing the details of construction of the chain and of the carriage-blocks, one of which is placed at each end of each pair of links of which the chain is composed. Fig. 12 is an enlarged vertical section through chain-tube, chain, and carriage-block. Fig. 13 is an enlarged cross-section through chain-tube, chain, and carriage-block. Fig. 14 is a perspective view of the grip open and in contact with the chain by means of the grip-plate T. Fig. 15 is a perspective view of the grip closed and gripping the rope or cable R R. Fig. 16 is an end view of the grip, showing the position of finger-rollers *s s* when the grip is closed and gripping the rope or cable. Fig. 17 is an end view of the grip, showing the position of the finger-rollers when open and in contact with the chain. Fig. 18 is an end view of the grip, showing the position of the finger-rollers when the grip is partly open and the rope supported by the finger-rollers. Fig. 19 shows the details of an automatic attachment for disengaging from the rope or cable at the commencement of a curve or other point for the purpose of making connection with an endless chain or for any other purpose.

In Fig. 1 the cable or rope R is shown passing round a curve by means of the sheaves or pulleys A. The rope, traveling in the direction indicated by the arrows, gives motion to the sheaves or pulleys A, causing them to revolve in the same direction as that in which the rope travels. The spur-gear B, keyed upon the same shaft as the sheave or pulley A, gives motion to the gear-wheel C, causing it to revolve in the direction indicated by the arrows, and the toothed wheel D, being keyed on the same shaft as the gear-wheel C, revolves in the same direction and gives motion to an endless chain traveling inside the chain-tube F F.

In Fig. 4 the wire rope or cable, passing round a curve by means of the sheaves or pulleys A, causes them to revolve in the direction indicated by the arrows, and the toothed wheel D, being keyed upon the same shaft, gives motion to an endless chain traveling inside the chain-tube F F. The car or dummy, being attached to the endless chain, travels round a curve, or wherever it may be necessary to use this mechanism, at a rate of speed suitable to the degree of curvature and radius of said curve, which rate of speed is determined by the proportion which the gear-wheels B and C, Fig. 1, or the sheave or pulley A and the toothed wheel D, Fig. 4, bear the one to the other, and the rate of speed of the cable from which their power is derived.

The sheaves or pulleys A may be either an ordinary grooved pulley, or may be any one of the description of pulleys generally known and designated as "grip-pulleys," either of metal, or a combination of metal and wood, or of wood entirely, or may be of the construction shown at Fig. 6, in which the part of the sheave or pulley A shown by shaded lines, and with which the rope R comes in contact, is intended to be of rubber, or of any composition of which rubber forms a part, or of rubber and canvas; or the whole of the pulley or sheave between the flanges may be of rubber, or of rubber and canvas, or of any composition of which rubber forms a part; or the part shaded, or the whole of the pulley between the flanges may be of leather put on in bands or rings. The face of the pulley may be straight across its face, or may be grooved, and such groove may or may not be lined with any substance or composition for the purpose of increasing the friction or adhesion between the rope and the pulley, the precise manner of construction and the materials of which the pulley or sheave would be constructed, and also its size, being determined by the nature of the work the pulley would have to perform, such as the size or weight of the cars or dummies required to be propelled or drawn through its agency, the size and speed of the rope, whether the curve or road was upon a level or a grade, and the steepness or otherwise of said grade, and the radius and degree of curvature of the curve.

The pressure-pulley H, Fig. 6, is for the purpose of increasing the pressure of the rope R upon the face of the sheave or pulley A, the pressure being maintained by means of a spring, I, acting on the block or frame upon which the pulley H is mounted, and is intended to be used in places where the pressure of the rope upon the face of the pulley does not produce the necessary amount of friction between the rope and the sheave or pulley A, such as when they would be arranged on a straight line at the commencement of a curve or at the crossing of another cable.

The gear-wheels B C may be of metal or wood, or of metal and wood combined, and may be geared in the ordinary way, or the periphery of said gear-wheels may be true circles without any indentations, cogs, or teeth, and straight across the face, as represented at Fig. 7, the shaded part of which may be of rubber, or of any composition of which rubber forms a part, or of rubber and canvas, or of leather, and may or may not extend to the center of the pulley. The parts not shaded represent metal flanges secured to the body of the wheel or pulley by bolts.

The shafts upon which the sheaves or pulleys A, the gear-wheels B C, and the toothed wheel D are keyed should revolve in anti-friction bearings, Fig. 5, in which the shaded portion represents the shaft surrounded by the anti-friction rollers set in a metal block, K, which is secured in a metal socket by the adjusting-screws L L.

The letters F F F, Figs. 1 and 4, indicate a tube, enlarged sections of which (indicated by the oblique parallel lines) are shown at Figs. 11, 12, and 13. The endless chain, to which the cars or dummies are attached, travels inside this tube in the direction indicated by the arrows and passes round an adjustable pulley, E. (Shown at Fig. 8.) The pulley is mounted on the slide G, Fig. 10, and revolves on anti-friction bearings, and is adjustable by means of a screw worked by worm-gearing at J. They may be placed at one or both ends of the tube, and are adjustable for the purpose of taking up the wear of the chain and maintaining it at proper tension. Each end of each pair of links of which the chain is composed is supported upon one of the carriage-blocks shown at Figs. 11, 12, and 13.

K, Fig. 11, is a top view of the top plate of one of these carriage-blocks. M, Fig. 11, is a bottom view of the lower plate. Each of the carriage-blocks is mounted on two rollers below, (marked N, Figs. 12 and 13,) which travel along the bottom of the tube, and both the upper and the lower plates are fitted with a roller, O, at each corner, which travels along each side of the tube. All of these rollers are intended to run upon anti-friction bearings, and are shown in section at Figs. 11 and 12, where the letters X denote the anti-friction rollers.

The chain-links are secured to the carriage-blocks by steel spindles P, screwed into the upper and lower plates, and an intermediate spindle is fixed in the center of each pair of links between the carriage-blocks, as shown at Q, Fig. 11. These steel spindles are for the purpose of connecting with the teeth of the toothed wheel or pulley, as shown at $X^3$, Fig. 2.

At suitable intervals throughout the length of the chain one of the lower links projects through the slot in the chain-tube, (shown at S', Fig. 13,) and a hinged projection is attached to it called the "grip plate," as shown at T, Figs. 11 and 13.

A grip of suitable construction for connecting either with the main cable of a cable road or with a supplementary endless chain while passing a curve or other point where it may be desirable to use said endless chain is shown at Figs. 14, 15, 16, 17, and 18, by means of which a gripping action is brought to bear upon three equidistant points in the circumference of the cable, or around the whole of its circumference, if desirable. The central portion of the grip is attached immovably to the portion of the grip-frame or shank projecting downward through the slot in the tunnel or tube, and is thereby attached to the car or dummy. The side portions are hinged to the fixed central portion at the points V, and have a range of one-fourth revolution in opening and closing. A movable slotted plate, Z, carrying the projecting pin Y, called the "grip-pin," is secured to each of the sides of the grip in such a manner as to allow of the projecting pin Y being forced back toward the center of the grip when necessary. The finger-rollers (marked $s$, Figs. 16 and 17) project downward and inward from the sides of the grip and are used for the purpose of picking up the cable or of carrying it suspended when the grip is partly open, as shown at Fig. 18. The sides of the grip are opened or closed by having lugs projecting from the sides outward and connected with the grip-bar W, Fig. 15, by links in such a manner that when the grip-bar W is forced downward by the action of the grip-handle $K^2$ and connecting-link $J^2$, Fig. 19, the sides of the grip are closed and grip the rope or cable, which causes the car or dummy to which the grip is attached to be drawn by the cable along the straight portion of the track, as shown at Figs. 15 and 16, in which position the finger-rollers $s$ fold into openings provided for that purpose; and upon the grip-bar W being raised, through the agency above described, the sides of the grip open and the slotted plates Z, carrying the projecting pin Y, come to a horizontal position, as shown at Fig. 17, so as to allow of the grip pin Y making connection with the grip-plate or projecting arm T of the supplementary endless chain, as shown at Fig. 14.

The hinge in the grip-plate T is for the purpose of enabling it to rise in the event of its being struck from below by the grip-pin. When the grip-pin has passed, the grip-plate being weighted below falls to its proper position. The chain-tube F F F, when used in connection with a curve, is concentric with the curve of the slot in the road-bed through which the grip-bar projects, so as to connect with the dummy, or is otherwise parallel to said slot, and has a continuous slot in the face, through which the grip-plate T projects for the purpose of connecting with the grip-pin.

The grip-pins D are secured to sliding plates Z, secured to the sides of the grip by guides and pins, and kept out to their proper position by the spring $Z'$ in such a manner that on approaching the grip-plate from behind, in the direction of the arrow, Fig. 14, the spring allows the plate and grip-pin to fall back. After the grip has passed the grip-plate the spring forces the plate Z out to its proper position, and upon the speed of the dummy being relaxed the grip-plate, coming in contact with the grip-pin, carries the grip and dummy to which it is attached round the curve.

At Fig. 17 one of the finger-rollers is shown in section, the spindle being screwed into the side of the grip and the center portion revolving on the anti-friction rollers X X.

The chain and chain-tube may be operated, in the manner hereinbefore described, by transferring power from the cable or rope by the sheave or pulley A, or by the toothed pulley or wheel D, set in motion by any other motive power.

Fig. 19 shows an automatic arrangement by which the spring handle or catch $G^2$ is disengaged from the segmental rack $H^2$, thereby allowing a disengagement of the grip from the cable to take place at the commencement of a curve or other point where it is desirable to so disengage, and by means of which the progress of the car or dummy is arrested. A cam-plate, $A^2$, fitted with a spring, is shown fastened to the under side of the rail $B^2$, said cam-plate being placed at any point where it is desirable to disengage from the cable. A roller, $C^2$, carried upon one end of the slotted lever or bar $D^2$, is carried along by the grip, to which it is attached, through the agency of the rope or cable R, and upon the roller $C^2$ coming in contact with the cam-plate $A^2$ while the car or dummy is in motion the end of the lever or bar $D^2$ is depressed, as shown by the dotted lines in the drawings, which causes the rod $c^2$ to descend, depresses the end of the lever-cam $E^2$ by means of the connecting-rod $V^2$, and the rod $F^2$, being also depressed, causes the spring handle or catch $G^2$ to be disengaged from the segmental rack $H^2$ and the cam $I^2$ to press against the link $J^2$, which forces the said link $J^2$ in the direction indicated by the dotted lines, which draws up the grip-bar W, Fig. 15, and causes the grip to assume the position shown at Fig. 18, and the pressure being thereby removed from the cable the progress of the car or dummy is arrested. The conductor or engineer or other person in charge of the mechanism then moves the grip-handle $K^2$ over to the position shown by the dotted lines at $L^2$, which causes the grip to assume the position shown at Figs. 14 and 17, when the grip-pin Y, coming in contact with the grip-plate or projecting arm T, causes the car or dummy to be carried round the curve by means of the supplementary endless chain, to which the said grip-plate or projecting arm T is attached, said endless chain being set in motion by power derived from the main cable through the mechanism hereinbefore described, or by separate motive power.

The cam $I^2$ is shown on the drawings by dotted lines to prevent confusion of parts, although it is intended to be placed on the outside of the grip-frame and centered at $M^2$, which is also the center upon which the grip-handle $K^2$ moves.

While the grip-handle $K^2$ is being moved over from $N^2$ to $L^2$ the upper part of the lever-cam $E^2$, coming in contact with the roller $P^2$, forces up the rod $F^2$ to its original position, so that when the grip-handle is again brought back toward $N^2$ the spring handle $G^2$ works in the ratchet $H^2$, as before. When the grip becomes disconnected from the cable, as before described, the grip-pin Y connects with the endless chain, which carries the car along from the time the disconnection is made from the cable, and as soon as the spring-stop $A^2$ has been passed the spring $S^2$, acting on the roller $T^2$, causes the rod $c^2$ to resume its original position.

In approaching a curve the spring-stop $A^2$ should be placed about midway between the adjustable pulley E, Fig. 1, and the first pulley or sheave A, and there should be a difference of level between these two points of three or four inches, so that the rail of the curve is that much higher than the rail on the straight part of the track, so as to enable the grip to pass clear of the pulleys or sheaves A A.

The toothed wheel or pulley D should be keyed to its shaft by means of a back plate, to which the toothed wheel would be attached by steel studs or screws working in slots in such a manner that while the back plate would be securely keyed to the shaft the toothed wheel would be at liberty to remain stationary, or to fall back for a one-fourth or one-half revolution, or more, if necessary, and be held up to its work by a spring attached to the back plate and the toothed wheel D in such a manner as to allow the inertia of the car or dummy to be overcome gradually upon contact being made with the grip attached to the car or dummy and the endless chain, thus preventing any sudden shock being communicated to the car or dummy at the moment of starting.

I claim—

1. A sheave or series of sheaves or pulleys, either singly or in groups, upon straight or curved lines, as a means of transferring power from cables used on cable roads to an endless chain, or other mechanical device, for the purpose of enabling cars or dummies on cable roads to travel on curves to pass from one cable or track to another cable or track or to cross other cables, substantially as described.

2. In a cable railway, a system of gear-wheels as a means of actuating and regulating the speed of an endless chain in proportion to that of the cable or rope from which its power is derived, substantially as described.

3. A toothed wheel or series of toothed wheels, in combination with a main sheave or sheaves as a means of transferring power from cables used on cable roads to an endless chain, either with or without a system of intermediate gearing mechanism, substantially as described.

4. In combination with a cable road and dummy or cars, a tube, either straight or curved in plan view, having a side slot, and a supplemental endless chain within the tube adapted to make a connection with the dummy or cars of the cable road, substantially as described.

5. An endless chain traveling inside a tube, said tube being either straight or curved in plan view and having a slot throughout its length, through which slot a certain number of the links of which said chain is composed, or attachments to said links, project beyond the outside of the tube for the purpose of connecting with the cars or dummies in use on cable roads, the said parts being combined and arranged substantially as described.

6. A grip in which the part surrounding the cable is divided into three equal parts of one hundred and twenty degrees of a circle, each of which parts may either come in immediate contact with the cable, in which case a gripping action would be brought to bear upon the whole of its circumference, or fitted with movable shoes or dies, so as to allow of gripping action on three equidistant points in its circumference, the central portion being fixed to a shank or portion of the grip-frame projecting downward through the slot in the tunnel or tube of said cable road, and thus connected with the car or dummy, and the side portions being hinged to the center at the points V, and connected by projecting lugs and connecting-links with an upright bar, W, having a vertical movement and operated by the grip-handle K² and connecting-link J², substantially as described, and having a projecting pin, Y, arranged upon the sides of the grip by the mechanism, substantially as described, for connecting with a supplementary endless chain, and having rollers revolving upon a fixed spindle, called "finger-rollers," arranged upon the lower portion of the sides of the grip, substantially as described, for the purpose of picking up the cable, and of carrying said cable suspended when the grip is partly open.

7. An automatic device for disengaging the grip from the cable on cable roads, comprising a cam-plate arranged within or upon the tunnel or tube, a lever or bar arranged upon the grip to be actuated by said cam-plate, and mechanism for connecting said bar with the spring handle or catch, and to disengage the same from the segmental rack, substantially as described.

8. An automatic device for disengaging the grip from the cable, comprising a cam-plate arranged within or upon the tunnel, a spring handle or lever-formed catch, a lever or bar arranged upon the grip to be actuated by said cam-plate, and mechanism for connecting said bar with the spring handle or catch.

9. A grip for cable railways comprising a fixed jaw combined with swinging jaws pivoted to grasp the cable and move it toward the fixed jaw to clamp it by the three jaws, substantially as described.

10. A grip for cable railways comprising a series of connected jaws, two of said jaws being pivoted to swing in a radius to grasp the cable to move it toward another jaw to clamp it between the series of jaws, substantially as described.

11. In a cable railway which passes around a curve, an independent subsidiary cable having its driving sheave connected with the shaft of a sheave by which the direction of the main cable is changed and deriving its power therefrom.

12. In a system for propelling cars by means of an endless rope or cable moving in an underground slotted tube or tunnel, the method of moving cars around curves, which consists in connecting them to a supplementary chain or cable which is driven by power derived from the movement of the main cable.

13. The improvement in moving cars around curves in cable railways, which consists in mounting a supplementary endless chain or cable on pulleys beneath a track, and providing the endless chain with arms which engage with a shank or projection extending downward from the car through a slot into the tunnel.

14. The improvement in the method of passing curves or other obstructions in cable railways, which consists in arranging a supplementary endless chain at a different level from the main cable, and to travel parallel with the curve of the track, and adapted to be connected with the grip of a car in lieu of a main cable while passing a curve, as set forth.

15. The method of passing curves or other obstructions in cable railways, which consists in connecting the car to a supplementary endless chain traveling along said curve or obstruction and conducting the main cable around such portion of the line at a lower level than said supplementary chain.

EDWIN JOHN WESTON.

Witnesses:
L. J. GUTIERREZ,
J. E. HAMILL.